(12) United States Patent
Koch et al.

(10) Patent No.: US 10,947,937 B2
(45) Date of Patent: Mar. 16, 2021

(54) FUNCTIONAL COMPONENT FOR INFLUENCING TANK VENTILATION AND ARRANGEMENT OF A FUNCTIONAL COMPONENT FOR INFLUENCING TANK VENTILATION ON AN INTAKE PIPE

(71) Applicants: Volkswagen Aktiengesellschaft, Wolfsburg (DE); BOGE Elastmetall GmbH, Damme (DE)

(72) Inventors: Johannes Koch, Braunschweig (DE); Alfons Laumann, Gifhorn (DE); Sebastian Pytel, Lohne (DE)

(73) Assignees: Volkswagen Aktiengesellschaft, Wolfsburg (DE); BOGE Elastmetall GmbH, Damme (DE)

( * ) Notice: Subject to any disclaimer, the term of this patent is extended or adjusted under 35 U.S.C. 154(b) by 30 days.

(21) Appl. No.: 16/388,232

(22) Filed: Apr. 18, 2019

(65) Prior Publication Data

US 2019/0323461 A1  Oct. 24, 2019

(30) Foreign Application Priority Data

Apr. 19, 2018 (DE) .................. 10 2018 109 412.4

(51) Int. Cl.
 *F02M 25/08* (2006.01)
 *F02M 35/10* (2006.01)
 *F16L 37/084* (2006.01)
(52) U.S. Cl.
 CPC ...... *F02M 35/10222* (2013.01); *F02M 25/08* (2013.01); *F02M 25/0872* (2013.01); *F02M 35/10118* (2013.01); *F16L 37/0841* (2013.01)

(58) Field of Classification Search
 CPC ......... F02M 35/10222; F02M 25/0872; F02M 35/10118; F02M 25/08; F16L 37/0841
 See application file for complete search history.

(56) References Cited

U.S. PATENT DOCUMENTS 3,836,128 A * 9/1974 Lunsford ............... F02M 23/04
  261/39.2
4,993,390 A * 2/1991 Ono ..................... F02M 55/004
  123/456

(Continued)

FOREIGN PATENT DOCUMENTS

CN  103270286 A  8/2013
DE    4441879 A1  5/1996

(Continued)

OTHER PUBLICATIONS

Chinese Office Action dated Oct. 22, 2020 in corresponding application 201910275054.1.

*Primary Examiner* — Thomas N Moulis
(74) *Attorney, Agent, or Firm* — Muncy, Geissler, Olds & Lowe, P.C.

(57) ABSTRACT

A functional component for influencing a tank ventilation of a fuel tank, functionally connected to an internal combustion engine, having a main body, wherein at least one flow channel for guiding fluid from an inlet side to an outlet side is formed in the main body, wherein at least one component for creating a clip connection of the functional component to an intake pipe is formed on the main body. The invention also relates to an arrangement of a functional component for influencing a tank ventilation of a fuel tank, functionally connected to an internal combustion engine, on an intake pipe.

8 Claims, 5 Drawing Sheets

(56) References Cited

U.S. PATENT DOCUMENTS

| | | | |
|---|---|---|---|
| 5,901,688 A | 5/1999 | Balsdon et al. | |
| 5,909,725 A * | 6/1999 | Balsdon | F02M 25/0836 |
| | | | 123/470 |
| 6,343,594 B1 * | 2/2002 | Koeslin | F02M 26/19 |
| | | | 123/568.11 |
| 6,412,828 B1 | 7/2002 | Lacroix et al. | |
| 7,320,301 B1 * | 1/2008 | Fonville | F02M 35/10144 |
| | | | 123/184.21 |
| 9,297,717 B2 | 3/2016 | Haag et al. | |
| 9,739,403 B2 | 8/2017 | Freter et al. | |
| 9,863,379 B2 | 1/2018 | Heinrich et al. | |
| 9,885,323 B1 | 2/2018 | Myers et al. | |
| 10,369,882 B2 * | 8/2019 | Mihara | F02M 37/103 |
| 2003/0075923 A1 * | 4/2003 | Lepoutre | F16L 37/084 |
| | | | 285/330 |
| 2003/0115871 A1 * | 6/2003 | Feucht | F02M 26/05 |
| | | | 60/605.1 |
| 2005/0034759 A1 * | 2/2005 | McIntosh | B60K 15/03519 |
| | | | 137/202 |
| 2012/0213580 A1 * | 8/2012 | Omori | F16B 21/078 |
| | | | 403/375 |
| 2013/0039694 A1 * | 2/2013 | Hampel | F16B 5/0664 |
| | | | 403/299 |
| 2015/0240764 A1 | 8/2015 | Walter et al. | |
| 2017/0114936 A1 * | 4/2017 | Tomlinson | F16L 55/07 |

FOREIGN PATENT DOCUMENTS

| | | |
|---|---|---|
| DE | 102014018578 B3 | 1/2016 |
| DE | 102015003792 A1 | 10/2016 |
| DE | 102016005468 A1 | 12/2016 |
| DE | 102017204785 A1 | 10/2017 |
| WO | WO9914478 A1 | 3/1999 |

* cited by examiner

US 10,947,937 B2

FUNCTIONAL COMPONENT FOR INFLUENCING TANK VENTILATION AND ARRANGEMENT OF A FUNCTIONAL COMPONENT FOR INFLUENCING TANK VENTILATION ON AN INTAKE PIPE

This nonprovisional application claims priority under 35 U.S.C. § 119(a) to German Patent Application No. 10 2018 109 412.4, which was filed in Germany on Apr. 19, 2018, and which is herein incorporated by reference.

BACKGROUND OF THE INVENTION

Field of the Invention

The present invention relates to a functional component for influencing tank ventilation of a fuel tank, functionally connected to an internal combustion engine, in particular in motor vehicles. The invention further relates to an arrangement of a functional component for influencing tank ventilation on an intake pipe.

Description of the Background Art

A coupling device for conduits conveying hydrocarbon liquids or vapors is known from DE 10 2015 003 792 A1, which corresponds to U.S. Pat. No. 9,739,403, wherein conduits can be tank ventilation conduits. The coupling device is intended to be used for creating a connection between a pipe-shaped insert component and a sleeve-like coupling body. In this respect, the coupling device is merely a connecting element which, moreover, does not fulfill any further function, such as, e.g., a venting function or a valve function. The coupling device comprises a coupling body with a connecting-piece receiving section and a locking member. The coupling device is thus designed in two parts and is intended to enable the simplest possible production out of plastic by injection molding. The locking member has radially inwardly directed, elastically displaceable locking latches, which work together with a projection of a connecting piece to be inserted and counteract a disconnection of the connecting piece from the coupling device. This results in the mounted state in a three-piece assembly comprising a coupling body, locking member, and connecting piece.

To influence the tank ventilation of a fuel tank functionally connected to an internal combustion engine, especially in motor vehicles, valves and/or Venturi nozzles are used in practice, via which the amount of purge gas for the tank ventilation or the amount of fuel vapors to be supplied to an intake pipe, and/or the time period for carrying out the tank ventilation are adjustable. It is known from practice to weld such tank ventilation functional components to an intake pipe.

SUMMARY OF THE INVENTION

It is therefore an object of the present invention to provide a functional component for influencing tank ventilation of a fuel tank, functionally connected to an internal combustion engine, and an arrangement of a functional component on an intake pipe of an internal combustion engine, which enable a particularly simple and cost-effective mounting on the intake pipe. In particular, the invention relates to functional components in the form of tank ventilation valves and/or Venturi nozzles and arrangements with such functional components.

A functional component of the invention for influencing tank ventilation of a fuel tank, functionally connected to an internal combustion engine, for example, of a fuel tank of a motor vehicle, comprises a main body, wherein at least one flow channel for guiding fluid from an inlet side to an outlet side is formed in the main body. The amount of fuel vapors from the fuel tank, which are supplied to the intake pipe, and the duration of tank ventilation phases in particular are controlled or regulated in terms of time and/or amount by means of the functional component. Furthermore, at least one component adapted to create a clip connection of the functional component to an intake pipe is formed on the main body.

The connection between the functional component takes place in particular in such a way that the inlet side or outlet side of the main body is connected to the intake pipe so that fluid can be introduced through the flow channel into the intake pipe. For sealing between the main body and the intake pipe, a sealing element, for example, a sealing ring, is disposed in particular on the intake pipe and/or on the main body. Preferably, the functional component is directly connected to an intake hood as part of the intake pipe by means of the clip connection. The intake hood forms in particular a part of the intake pipe of the internal combustion engine, on which damping elements and/or resonators are disposed, which serve to reduce the flow noise and/or vibration noise of the intake pipe. The intake hood is connected in particular upstream on an inflow side to a clean air duct. As an alternative or in addition thereto, the intake hood is connected in particular downstream on an outflow side to a compressor of an exhaust gas turbocharger.

A clip connection enables a time-efficient, simple and, above all, tool-free mounting of the functional component on the intake pipe. It is also advantageous that no further components are needed to create a connection, such as, for example, screws, rivets, or other separate coupling elements. In addition, a relatively expensive and complicated welding of the functional component to the intake pipe can be omitted due to the clip connection. Welding has the further disadvantage that the components to be welded usually must be made from the same materials or at least materials that can be joined to one another by welding. Because functional components are often produced in practice from high-quality and thus rather expensive plastic, such as, for example, polyacrylamide (PA), in the case of a desired welding, it follows that the intake pipe also has to be made of a rather expensive plastic. The realization of a suitable connection by means of a clip connection makes it possible to produce the intake pipe of any and in particular of a less expensive plastic than, for example, out of polypropylene (PP).

Particular advantages of the invention result if the main body is formed at least as part of a Venturi nozzle or for receiving a Venturi nozzle. Such a Venturi nozzle has in particular a first flow channel with a first inlet side and an outlet side, as well as a second flow channel with a second inlet side. In this case, the second flow channel usually opens into the first flow channel or vice versa. In an arrangement of the invention, the first inlet side of the first flow channel is connected in particular to an intake pipe downstream of a compressor of a turbocharger, in particular to the so-called pressure tube, and the outlet side is connected to the intake pipe upstream of the compressor. The second inlet side in this case is fluidically connected via a tank vent line to the fuel tank. Depending on the respective mass flow, a different sized negative pressure is generated in the second flow channel by controlling and/or regulating the mass flow through the first flow channel, as a result of which the ventilation of the fuel tank is influenced.

It is also advantageous if the main body is formed at least as part of a valve or for receiving a valve. A valve of this kind can also be used to influence a tank ventilation of a fuel tank, in particular if the inlet side of the flow channel is fluidically connected to the fuel tank and the outlet side is fluidically connected to an intake pipe. The cross section of the flow channel is narrowed or completely closed by the valve as needed, so that if required, control and/or regulation of the tank ventilation are possible. For this purpose, the valve is preferably provided with a pneumatic, hydraulic, and/or electrical connection, which serves to drive the valve. Alternatively or in addition thereto, an additional, externally driven pump can be provided to convey fluid through the flow channel.

At least one clip can have at least one detent contour is formed on the main body. For example, two, three, four, or more clips of this kind can be formed. In particular, a clip or a plurality of clips are configured to work together with a corresponding clip mount in the intake pipe.

The features of the at least one clip as described below can apply, but not necessarily, to multiple clips, if two, three, four, or more clips are provided.

The at least one clip can be formed resilient and allows a resilient compression and rebound by a flexurally elastic design, in particular in a direction transverse to a connection direction or insertion direction. In this case, the direction in which the clip has to be moved in order to be inserted into a corresponding clip mount and thus brought into its locking position is designated as the connection direction or insertion direction. The at least one clip preferably has a clip body and a clip head with the detent contour. The clip body preferably has a width of 0.5 mm to 2 mm, and preferably of 1 mm to 1.5 mm, extending transverse to the longitudinal extent of the clip, in order to provide a suitable spring elasticity.

In the present case, a detent contour can be, for example, the formation of an abutment face on a clip, which extends transverse to the connection direction or insertion direction, in particular perpendicular to the connection direction or insertion direction. Preferably, an undercut with a blocking surface extending transverse to the insertion direction is formed in the corresponding clip mount; the blocking surface corresponds to the abutment face and interacts such that the clip is locked and loosening of the clip connection is prevented. A clip of this kind with a detent contour represents a particularly simple component, which is intuitive to use, for creating the clip connection.

In relation to a clip or a plurality of clips, it is particularly advantageous if at least one cover structure is formed on the main body of a functional component with the clip or on the main body of a functional component with a clip mount such that a loosening actuation of the clip in an inserted locking position is made inaccessible by the cover structure and thus prevented. A cover structure of this kind is in particular formed integrally with the main body of the clip or with the main body of the clip mount. In the case of formation on the main body of the clip, the cover structure extends in particular at least over part of the clip length extending in the insertion direction.

A cover structure can be formed in particular plate-shaped, i.e., have a thickness which is much smaller than the length and the width, in particular less than 20 percent, less than 10 percent, or less than 5 percent of the respective smaller dimension of the length or width.

In particular, the cover structure can be designed such that it projects transverse and longitudinally to the insertion direction with respect to a clip head with the detent contour. If the main body itself has a cover structure, the clip connection is particularly secure because the cover structure reliably prevents actuation of the clip in an inserted locking position, and thus an inadvertent and non-destructive loosening of the clip from the clip mount is effectively prevented. The clip connection is preferably designed as a non-detachable connection, i.e., designed such that after a one-time creation of the clip connection it is not loosened again at least non-destructively with the help of a tool. This design has the advantage that a factory assembly at a vehicle manufacturer or automotive supplier with functional testing of the sealing function, especially in the mounted state in a motor vehicle, can be designed usually for the life of the motor vehicle and a deliberate or accidental loosening at a motor vehicle repair shop can be reliably avoided. Thus, it can be ruled out that a complete or partial loosening of a connection and/or improper reassembly of a loosened connection lead to minor leaks, which cannot be reliably detected by means of diagnostic devices available in motor vehicles, in particular by a so-called on-board diagnosis (OBD). The cover structure in this case ensures that the connection is not unintentionally loosened or manipulated, and a partial or only slight loosening of the clip connection is reliably prevented.

As already indicated, as an alternative or in addition to a clip, at least one clip mount for a corresponding clip disposed on the intake pipe can be formed on the main body. Such a clip mount is designed in particular in the form of an indentation or opening in the main body, in particular such that a corresponding clip can be inserted completely or partially into the clip mount. The clip mount is in particular designed such that it has an undercut with a blocking surface which works together with a detent contour of the corresponding clip and thus counteracts a pulling of the clip out of the clip mount.

In particular, a plurality of clips and/or clip mounts are formed on the main body, preferably at least two, three, four, or more clips and/or clip mounts. The clips or clip mounts are preferably distributed over the extent of the main body, particularly preferably distributed approximately uniformly over the extent. Preferably, two, three, four, or more clips and/or clip mounts are provided on the functional component in order to fix the functional component in a predetermined position and rotationally secured with respect to the intake pipe and to distribute the connection forces, acting on the clips, over a plurality of clips.

The clip mount on the main body can be designed such that the clip connection between the functional component and the intake pipe is designed as a non-separable connection; i.e., the connection cannot be loosened non-destructively, preferably also not with the help of a standard tool and also not with the help of a special tool. This is preferably realized in that the detent contour is completely covered by the clip mount in an inserted locking position and it also cannot be achieved by means of tools that the clip connection can be loosened again. Because demolding openings for demolding the undercut in the clip mount are necessary in part, an additional cover component is optionally provided, which closes the demolding openings and covers the clip completely with the detent contour in the clip mount.

The main body can be formed in two parts. In particular, the main body has an upper part and a lower part, which are preferably connected to one another by means of welding, gluing, screwing, and/or by means of a further clip connection. The parting plane between the upper part and the lower part of the main body is located in particular in the region of a clip mount formed on the main body. As a result, undercuts which are difficult to demold, in particular in the area of the clip mount, can be avoided, as a result of which a cost-effective production of the main body in the plastic injection molding process can take place despite undercuts to be realized.

The mold parting plane for the production of the upper part and/or lower part can be located in the region of the blocking surface of the clip mount, in particular such that the blocking surface extends in the direction of the mold parting plane and is itself part of the mold parting plane.

The invention also relates to an arrangement of a functional component for influencing tank ventilation of a fuel tank, functionally connected to an internal combustion engine, on an intake pipe of the internal combustion engine. This functional component is, in particular, a functional component as described above and/or a separately claimed functional component.

A corresponding component for creating a clip connection can be formed on the functional component and on the intake pipe of the internal combustion engine of an arrangement of the invention, and the functional component is clipped directly to the intake pipe. The functional component is in particular a valve or a Venturi nozzle. Direct clipping can mean that no further connecting elements are placed or interposed between the functional component and the intake pipe, for example, coupling elements that are manufactured separately and are to be mounted separately. As already explained above, clipping of the functional component to the intake pipe makes possible a particularly simple assembly and a cost-effective production of the intake pipe from a relatively low-priced plastic, whereas the functional component can be fabricated of any desired, higher-quality plastic.

The intake pipe can have at least one clip mount which, in addition to an insertion opening for a corresponding clip, has a demolding opening extending transverse to the insertion direction, in particular a demolding opening extending perpendicular to the insertion direction. If a plurality of clip mounts are provided, the demolding openings can all extend in the same direction, for example, all perpendicular or substantially perpendicular to the insertion direction. A demolding opening is required in particular when an undercut formed in the clip mount is to be easily demoldable with the blocking surface by means of plastic injection molding.

To prevent loosening of the clip connection between the functional component and the intake pipe via the demolding openings, the demolding opening, especially in the case of an inserted clip in the locking position, is completely closed by a cover structure disposed on the functional component such that the clip in the locking position is no longer accessible via the demolding opening for loosening from the locking position. For this purpose, the cover structure preferably extends over the entire cross-sectional area of the demolding opening. Thus, in particular, a clip connection secured against unintentional or undesired loosening can be produced, in particular a clip connection that cannot be loosened again in a non-destructive manner, preferably also not with a standard tool or a special tool.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein.

DETAILED DESCRIPTION

Figure 1:
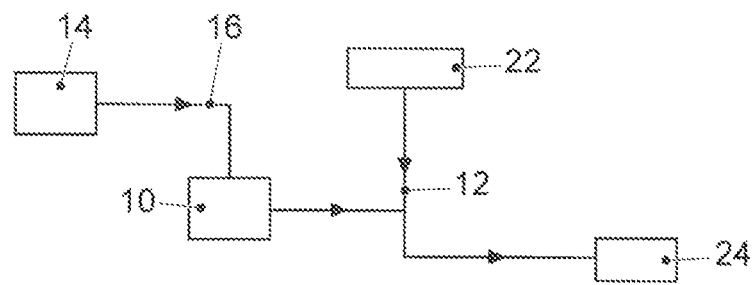
FIG. 1 is a schematic overview of an arrangement of a functional component of the invention.

FIG. 1 shows a schematic view of an arrangement of a functional component 10, shown only schematically, on an intake pipe 12. On the far left in FIG. 1, a fuel tank 14 is shown, which is shown schematically as a block and which is functionally connected to functional component 10 via a tank vent line 16. Functional component 10 can be either a valve or a Venturi nozzle, as will be explained in more detail below. Functional component 10 is connected fluidically and thus in a flow-conducting manner to intake pipe 12. Intake pipe 12 extends here between an air filter 22 and a compressor 24 of an exhaust gas turbocharger.

In connection with the following FIGS. 2 to 10, three different embodiments of arrangements and functional components 10 on an intake pipe 12 are explained below.

Figures 2, 3:
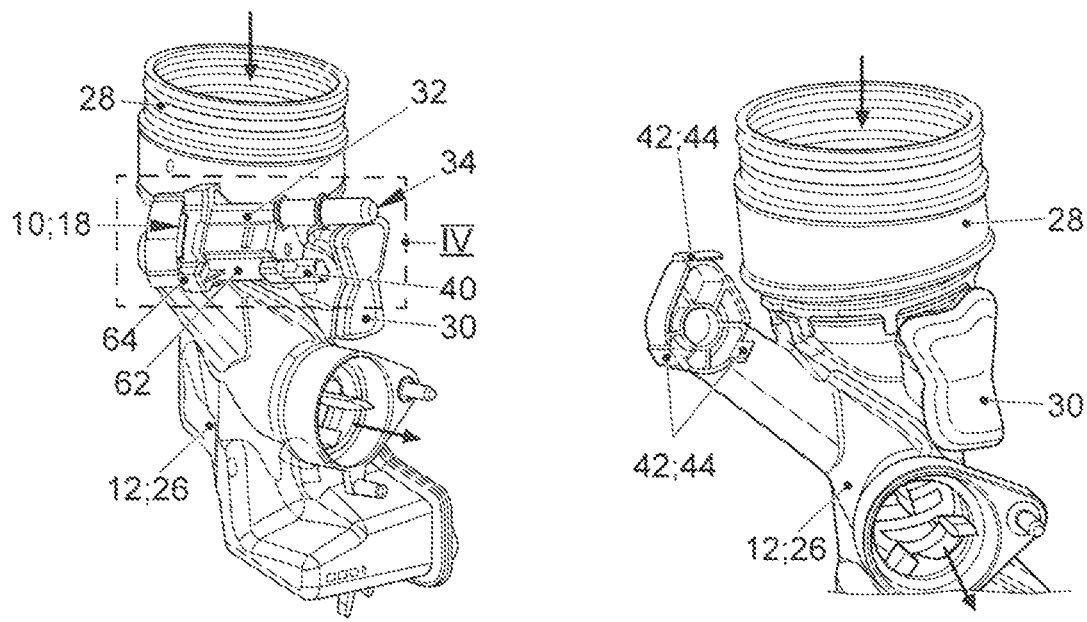
FIG. 2 shows an embodiment of an arrangement of the invention with an embodiment of a functional component of the invention in the form of a valve in a first perspective view.
FIG. 3 shows the embodiment from FIG. 2 without the valve in a further perspective view.
Figure 4:
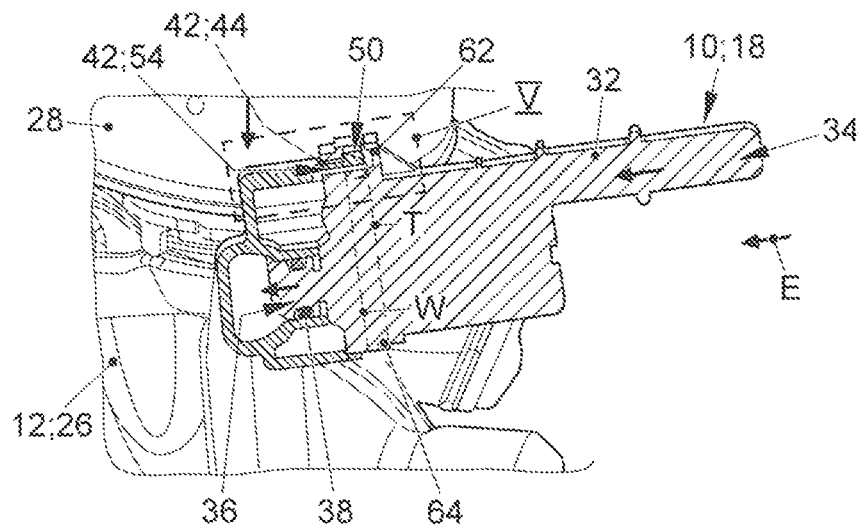
FIG. 4 shows the area marked with IV in FIG. 2 in an enlarged representation in a schematic sectional representation.

A first embodiment of an arrangement with a first embodiment of a functional component 10 is shown in FIGS. 2 to 4. Said functional component 10 is a valve 18, which is connected directly to an intake hood 26. In this case, intake hood 26 forms part of intake pipe 12. During operation of an internal combustion engine, intake air flows through intake pipe 12 in the direction of the arrows leading out of intake pipe 12.

Intake hood 26 is connected upstream to a clean air pipe 28. A compressor of an exhaust gas turbocharger connects downstream to intake hood 26. In addition, a plurality of resonators, which are used for damping vibrations, are provided on intake hood 26 under cover 30. These resonators are optional elements which need not be present for the realization of the invention.

Functional component 10, here in the form of valve 18, has a main body 32. A flow channel which leads from an inlet side 34 to an outlet side 36, is formed in main body 32. In the present case, inlet side 34 is connected in a flow-conducting manner to tank vent line 16 and to a fuel tank 14 disposed upstream thereof. Outlet side 36 is directly connected to intake hood 26. A sealing ring 38 is disposed on main body 32 of functional component 10 in the region of outlet side 36 so that the connection between outlet side 36 and intake hood 26 is reliably and permanently sealed (cf. FIG. 4). Further, an electrical connection 40, via which valve 18 can be controlled, is provided on main body 32, wherein in particular it is possible to switch between an open position and a closed position. It is optionally also possible that a plurality of open positions are provided with differently sized flow cross sections.

The connection between intake hood 26 and valve 18 is realized in the present case by means of a clip connection. For this purpose, both intake hood 26 and valve 18 have a component 42 for creating the clip connection. As can be seen in FIG. 3, intake hood 26 in the present case has three clips 44 as such component 42. Intake hood 26 is designed cam-like in the region of the three clips 44 and clips 44 are arranged distributed approximately uniformly over the extent of this cam-like area. It can be clearly seen in FIGS. 4 and 5 that clips 44 comprise a clip body 46 and a clip head 48, wherein clip head 48 has a detent contour 50 with an abutment face 52. Clip mounts 54 corresponding to clips 44 are formed in the form of openings on main body 32 of valve 10 as component 42. Clip mounts 54 each have an undercut 56 with a blocking surface 58.

To create the clip connection, clips 44 are inserted into the corresponding clip mounts 54 in insertion direction E through an insertion opening 60. Clips 44 are formed resilient and in the present case spring transverse to insertion direction E first radially inward, in relation to the insertion axis, and after reaching the locking position in the region of undercuts 56 radially outward again. The locking position can be clearly seen in FIGS. 4 and 5. Loosening of the clip connection is prevented by the interaction of abutment face 52 and blocking surface 58.

Figure 5:
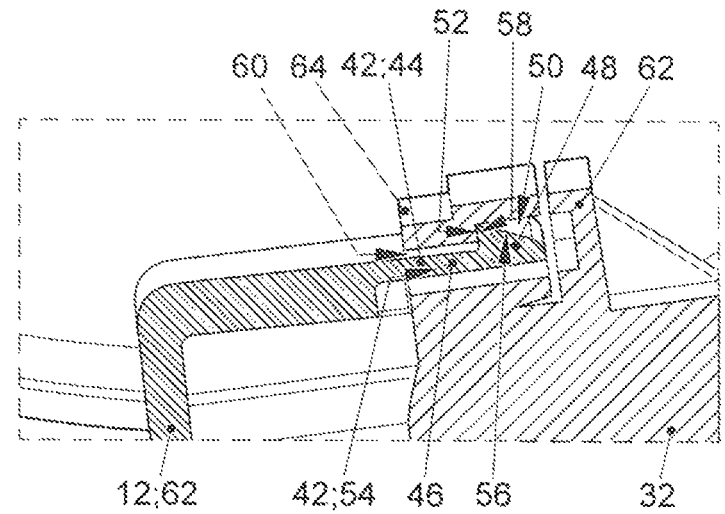
FIG. 5 shows the area marked with V in FIG. 4 in an enlarged representation.

In the present case, main body 32 of valve 18 is designed such that clips 44 in the locking position shown in FIGS. 4 and 5 cannot be pulled out of the respective clip mount 54 non-destructively. Clips 44 are surrounded in the locking position by main body 32 of functional component 10 such that accessibility and thus actuation or release of clips 44 are not possible either manually or by means of a tool.

In order to be able to realize undercuts 56 in an advantageous technical manner in a plastic injection molded part, main body 32 of valve 18 is formed in two parts, wherein main body 32 comprises an upper part 62 and a lower part 64. The parting plane between upper part 62 and lower part 64 is visualized in FIG. 4 by the line marked T. In the present case, the demolding of lower part 64 takes place along the mold parting plane marked W, which is located at the level of blocking surface 58.

Figure 6:
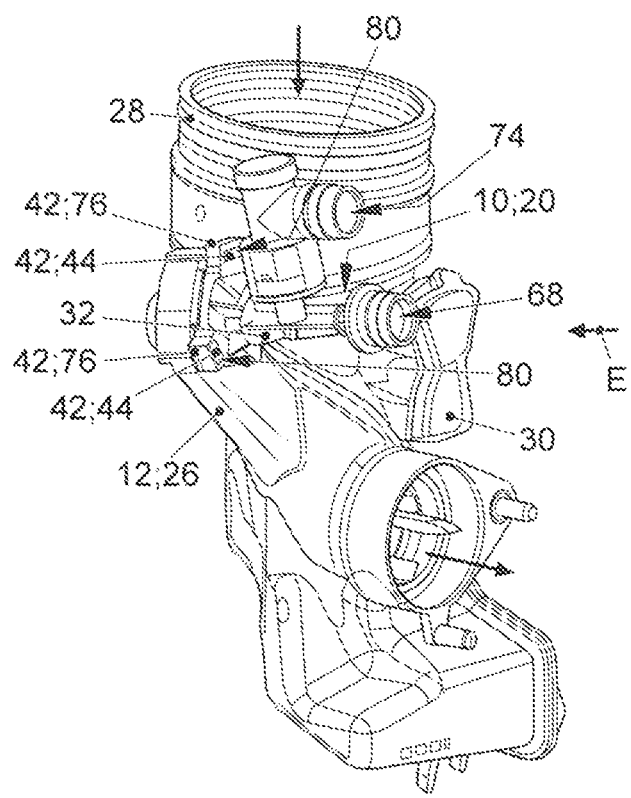
FIG. 6 shows an embodiment of an arrangement of the invention with an embodiment of a functional component of the invention in the form of a Venturi nozzle in a perspective view.
Figure 7:
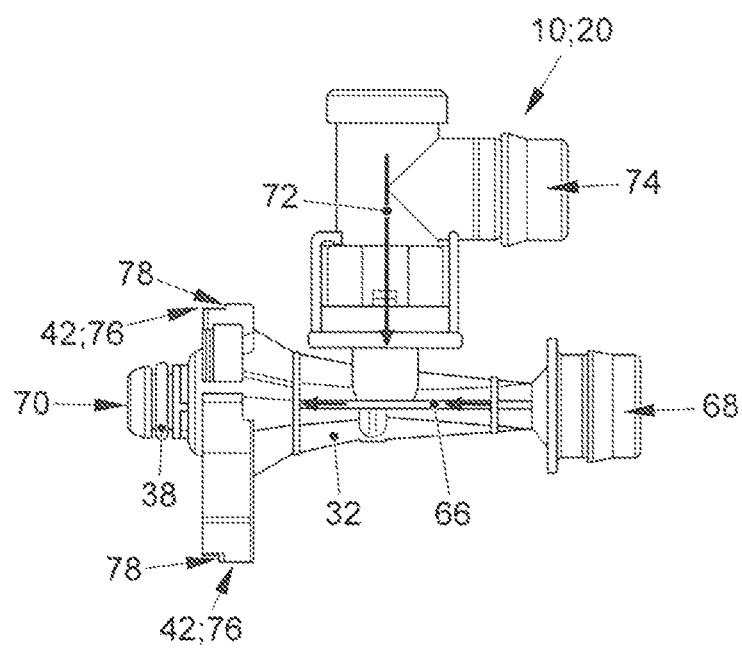
FIG. 7 shows only the Venturi nozzle from FIG. 6 in a separate representation in a side view.
Figure 8:
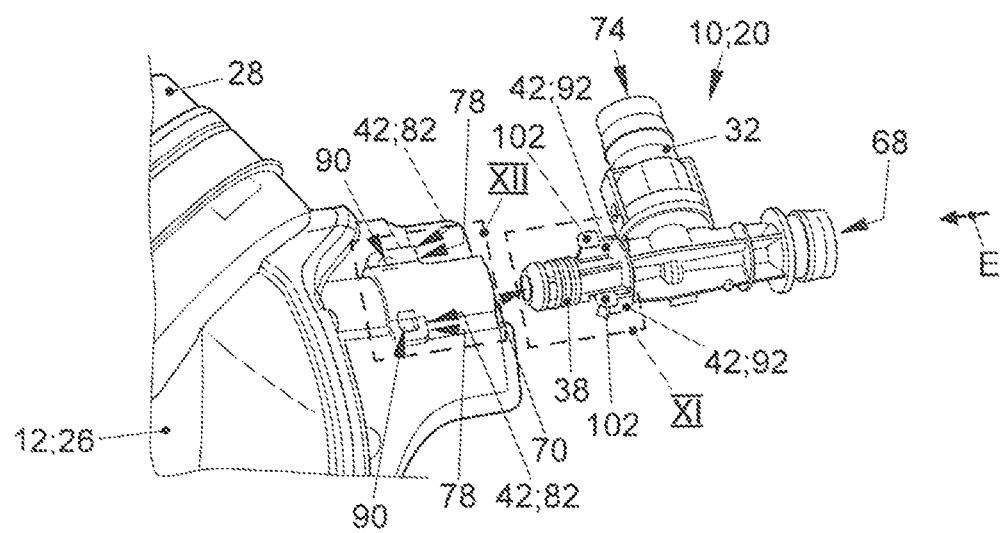
FIG. 8 shows an embodiment of an arrangement of the invention with an embodiment of a functional component of the invention in the form of a Venturi nozzle in an exploded perspective representation.

A second embodiment of an arrangement with a second embodiment of a functional component 10 is shown in conjunction with FIGS. 6 and 7. Hereinafter, the same reference characters as for the description of the first embodiment are used for identical or at least functionally identical components to explain this second embodiment and a third embodiment.

Functional component 10 shown in FIGS. 6 and 7 is a Venturi nozzle 20. In the present case, Venturi nozzle 20 is clipped by means of a clip connection to an intake hood 26. Intake hood 26 corresponds to the intake hood 26 shown in FIGS. 2 to 5. At the position (interface) at which in the embodiment shown in FIGS. 2 to 5, valve 18 is connected to intake hood 26, in the embodiment shown in FIGS. 6 and 7, Venturi nozzle 20 is connected to intake hood 26.

In main body 32 of Venturi nozzle 20, a first flow channel 66 is provided with a first inlet side 68 and an outlet side 70. The first inlet side 68 in this case is used to connect to a pressure pipe downstream of a compressor of an exhaust gas turbocharger. Outlet side 70 opens directly into intake hood 26. In addition, a second flow channel 72 is formed with a second inlet side 74, which is connectable to tank vent line 16, which leads to fuel tank 14. Second flow channel 72 opens into first flow channel 66. By changing the mass flow through first flow channel 66, which can be controlled and/or regulated, the negative pressure in second flow channel 72 can be changed, as a result of which the tank ventilation of fuel tank 14 can be controlled and/or regulated.

At the positions where clips 44 are arranged at valve 18 from FIGS. 2 to 5, three clip mounts 76 are formed on main body 32 of Venturi nozzle 20 (only two clip mounts 76 are visible in FIGS. 6 and 7), which serve to mount the three clips 44 formed on intake hood 26. Clip mounts 76 are functionally identical and realized with the same technical features as clip mounts 54 of valve 18, which is shown in FIGS. 4 and 5. As is clear from an overview of FIGS. 6 and 7, clip mounts 76 are formed such that opposite to an insertion opening 78, a demolding opening 80 extending in insertion direction E is formed, as a result of which clips 44 still remain accessible even in their locking position. In order to counteract a loosening of the clip connection, in addition to main body 32, a separate cover component can be provided which covers demolding openings 80 in order to prevent access and actuation of clips 44, in particular for the purpose of loosening the clip connection.

FIGS. 8 to 12 show a third embodiment of an arrangement with a third embodiment of a functional component 10. Functional component 10 shown here is likewise a Venturi nozzle 20.

Venturi nozzle 20 is constructed substantially identically to Venturi nozzle 20 shown in FIGS. 6 and 7, in particular with respect to first flow channel 66 and second flow channel 72. Venturi nozzle 20 of FIGS. 6 and 7 and of FIGS. 8 to 12 therefore function in the same way. The essential differences of the third embodiment will be discussed hereinafter, which are realized above all in relation to the clip connection.

In the present case, two clip mounts 82 are formed in the form of openings as component 42 for creating a clip connection on intake hood 26. As can be clearly seen in FIG. 12, clip mounts 82 each have an undercut 84 with a blocking surface 86. In order to demold these undercuts 84 with blocking surface 86, in addition to an insertion opening 88 for a clip, a demolding opening 90 is formed extending transverse, here perpendicular, to insertion direction E.

Figure 10:
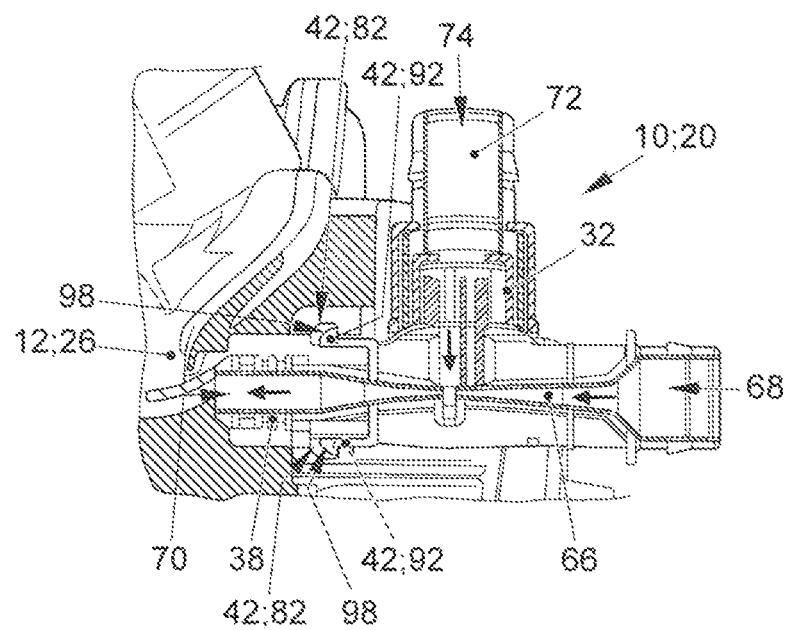
FIG. 10 shows the area marked with X in FIG. 9 in a sectional representation.
Figure 11:
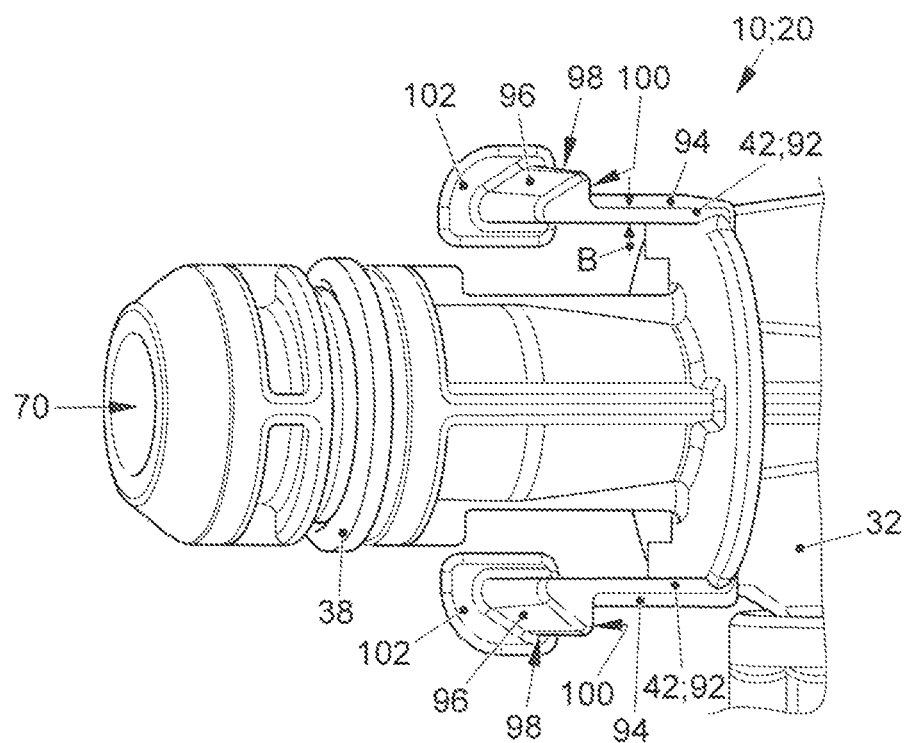
FIG. 11 shows the area of the Venturi nozzle marked with XI from FIG. 8 in an enlarged representation in a view from below.
Figure 12:
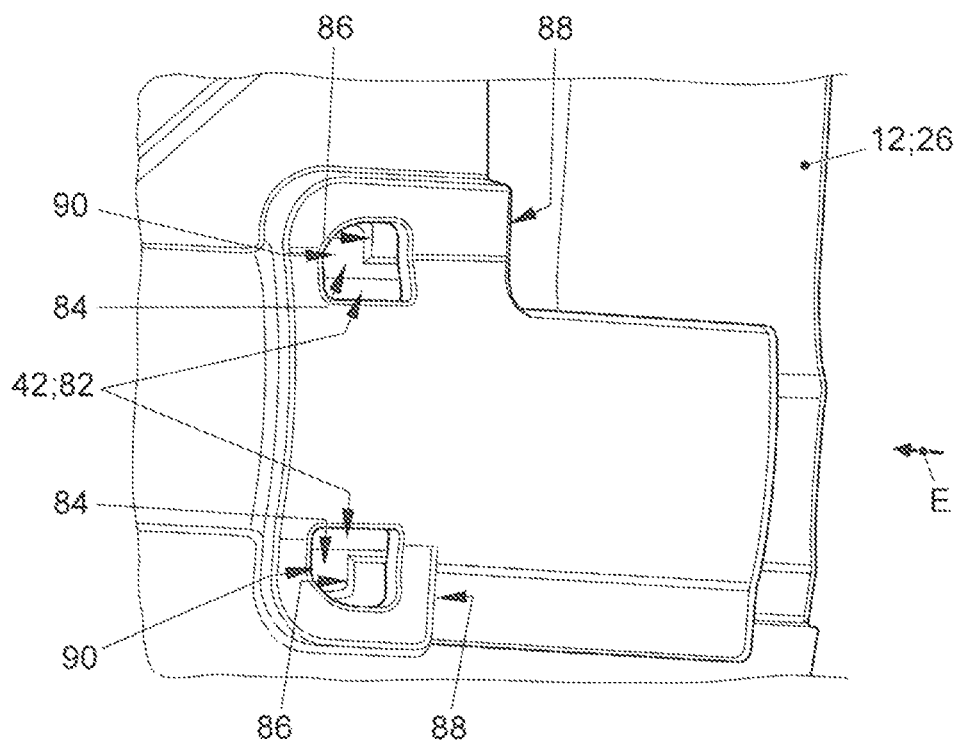
FIG. 12 shows the area of the intake pipe marked with XII in FIG. 8 in an enlarged representation.

FIGS. 10 and 11 show the two clips 92 corresponding to clip mounts 82. In this case, clip bodies 94 of clips 92 each have a width B of 1.25 mm extending transverse to insertion direction E and are formed resilient transverse to insertion direction E. Clips 92 have a clip head 96 with a detent contour 98 and with an abutment face 100. A cover structure 102 is formed integral with the respective clips 92. Cover structure 102 is shown in a top plan view in FIG. 8 and in a view from below in FIG. 11. Cover structure 102 is disposed on the side of clip head 96, which in the locking position faces demolding opening 90. Cover structure 102 is formed plate-shaped and projects beyond clip head 96 both in insertion direction E and also transverse thereto.

Figure 9:
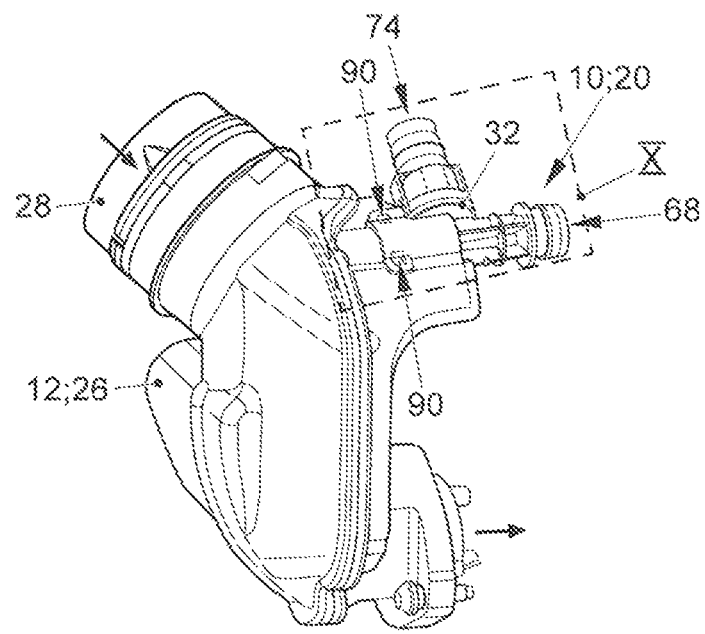
FIG. 9 shows the embodiment from FIG. 8 in a perspective view.

In a locking position shown in FIG. 9, demolding opening 90 is completely closed by means of cover structure 102 so that the respective clip 92 is no longer accessible in the locking position via demolding opening 90 and thus can no longer be actuated without destruction.

The features of the invention disclosed in the present description, in the drawings, and in the claims can be essential both individually and in any desired combinations for the realization of the invention in its various embodiments. The invention can be varied within the scope of the claims and in consideration of the knowledge of the skilled artisan.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:

1. A functional component for influencing tank ventilation of a fuel tank functionally connected to an internal combustion engine, the functional component comprising:
   a main body;
   at least one flow channel for guiding fluid from an inlet side to an outlet side, the at least one flow channel being formed in the main body; and
   at least one component for creating a clip connection of the functional component to an intake pipe is formed on the main body,
   wherein at least one clip is formed on the main body, the at least one clip having a clip head with a detent contour, and
   wherein at least one cover structure is formed on the main body such that a loosening actuation of the at least one clip is prevented in an inserted locking position.

2. The functional component according to claim 1, wherein the main body is formed at least as part of a Venturi nozzle or a valve or for receiving a Venturi nozzle and/or a valve.

3. The functional component according to claim 1, wherein at least one clip mount for a corresponding clip disposed on the intake pipe is formed on the main body.

4. The functional component according to claim 3, wherein the at least one clip mount is formed on the main body such that the clip connection between the functional component and the intake pipe is designed as a non-separable connection.

5. The functional component according to claim 1, wherein the main body is formed in two parts.

6. An arrangement of a functional component on an intake pipe of an internal combustion engine, the functional component for influencing tank ventilation of a fuel tank functionally connected to the internal combustion engine, wherein at least one component that creates a clip connection is formed on the functional component and on the intake pipe of the internal combustion engine and wherein the functional component is clipped directly to the intake pipe,
   wherein a clip is formed on the functional component, wherein the intake pipe has at least one clip mount which includes an insertion opening for receiving the clip and a demoldinq opening extending transverse to an insertion direction of the clip, and
   wherein when the clip is fully inserted into the insertion opening, so as to be in a locking position, the demolding opening is completely closed by a cover structure disposed on the functional component, such that the clip, when in the locking position, is no longer accessible via the demolding opening.

7. The functional component according to claim 1, wherein the at least one cover structure is provided on a side surface of the clip head, and wherein the at least one cover structure is plate-shaped and projects beyond the side surface of the clip head in both an insertion direction of the clip and a direction transverse to the insertion direction.

8. The arrangement according to claim 6, wherein the clip of the functional component has a clip head with a detent contour, wherein the cover structure is provided on a side surface of the clip head, and wherein the cover structure is plate-shaped and projects beyond the side surface of the clip head in both the insertion direction of the clip and a direction transverse to the insertion direction.

* * * * *